United States Patent [19]

Rosen

[11] Patent Number: 5,094,316

[45] Date of Patent: Mar. 10, 1992

[54] OVERHEAD SPEAKER SYSTEM FOR USE IN VEHICLES

[75] Inventor: Christer Rosen, Palm Beach Gardens, Fla.

[73] Assignee: Top Source, Inc., Palm Beach Gardens, Fla.

[21] Appl. No.: 584,454

[22] Filed: Sep. 18, 1990

[51] Int. Cl.$^5$ .............................................. G08B 1/08
[52] U.S. Cl. ....................................... 181/141; 381/205
[58] Field of Search ...................... 181/141, 144, 148; 381/205, 188, 182, 181

[56] References Cited

U.S. PATENT DOCUMENTS

| | | | |
|---|---|---|---|
| 4,099,026 | 7/1978 | Persson et al. | 181/144 X |
| 4,100,372 | 7/1978 | Hypolite | 181/148 X |
| 4,673,056 | 6/1987 | Koppelomäki | 181/141 |

*Primary Examiner*—Brian W. Brown
*Assistant Examiner*—Khanh Dang
*Attorney, Agent, or Firm*—Reising, Ethington, Barnard, Perry & Milton

[57] ABSTRACT

An overhead speaker system (10) adapted to be mounted to opposing lintels (12) of a vehicle (14). The speaker system (10) is particularly adapted to be mounted to the sports bars (20) of a vehicle (14). The speaker system (10) includes an elongated support member (16) having a longitudinal axis (26) extending between first (22) and second (24) ends. The system (10) further includes at least one speaker cabinet (46) and at least one speaker (50) therein. The speaker system (10) is characterized by including at least one fastening element (28) mounted to the elongated support member (16) and extending transversely from the longitudinal axis (26) for securing the elongated support member (16) to the vehicle (14). The elongated support member includes a cover 66 and may include accessories thereon such as an illuminating lamp 90, storage compartment 94, audio cassette player 92 and modular telephone.

23 Claims, 3 Drawing Sheets

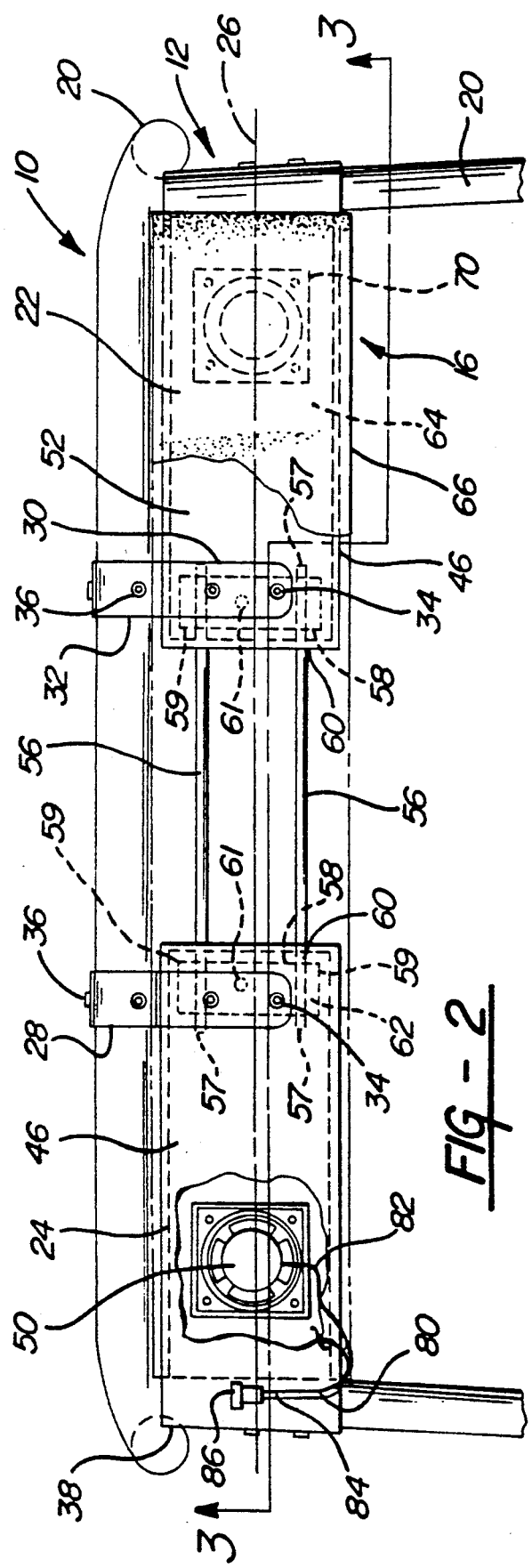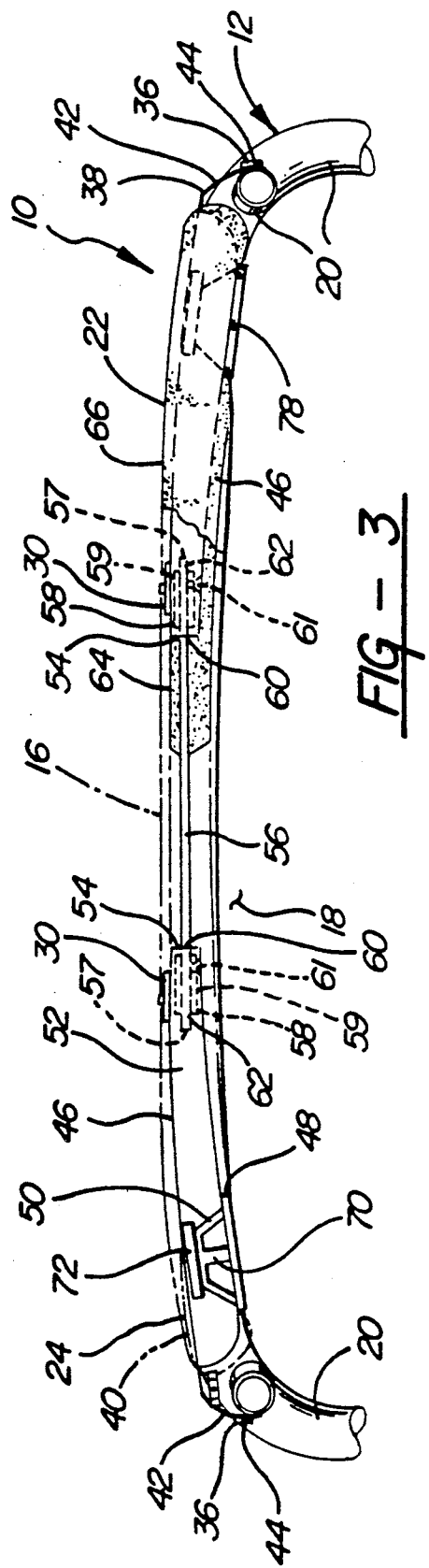

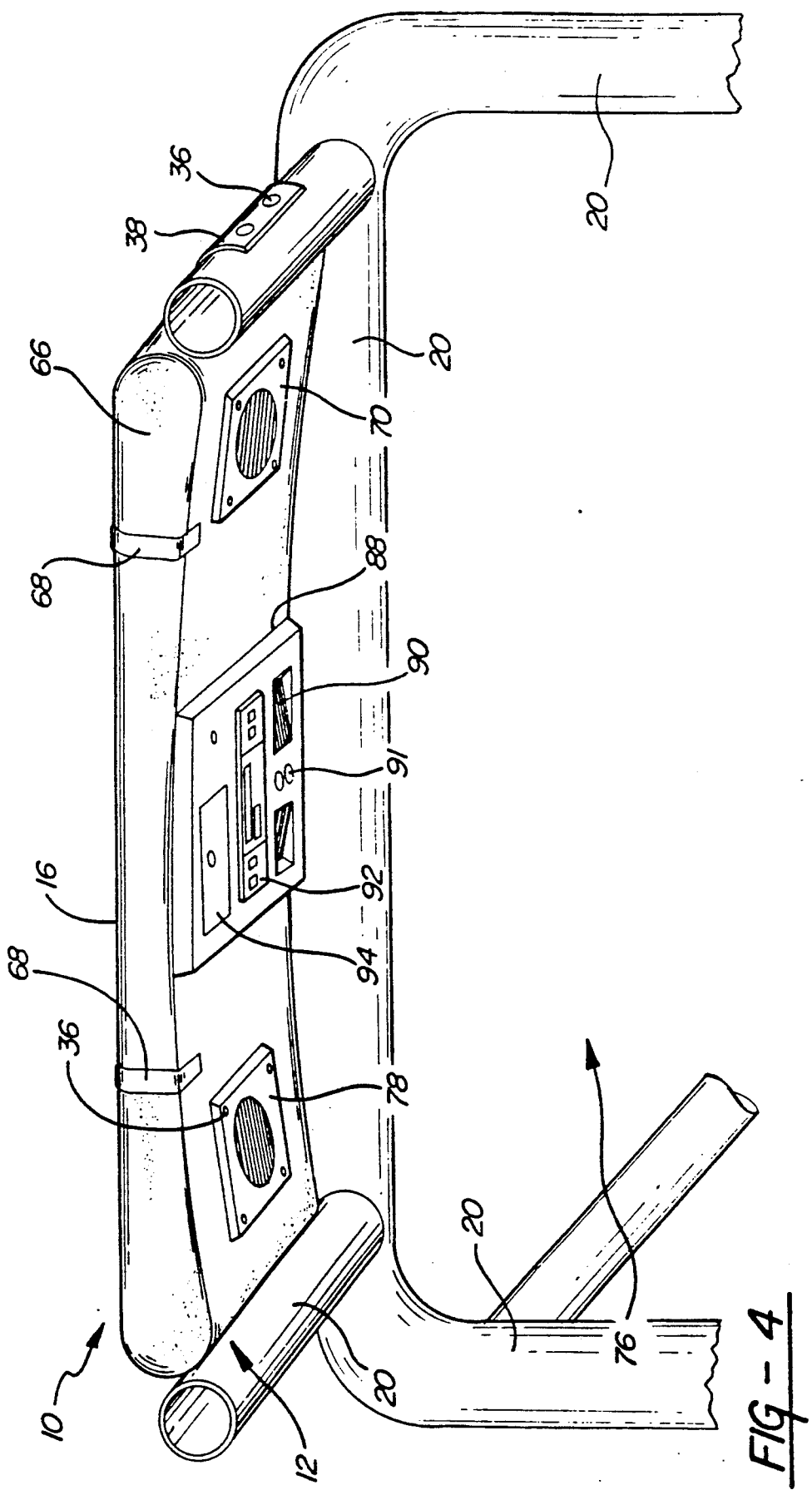

OVERHEAD SPEAKER SYSTEM FOR USE IN VEHICLES

BACKGROUND OF THE INVENTION

1. Technical Field

The present invention generally relates to an acoustical device for use in vehicles. More specifically, the invention relates to an overhead speaker system which includes an elongated support member designed to extend across the ceiling of a vehicle and further includes at least one speaker cabinet and speaker therein for sound reproduction.

2. Background Art

Overhead speaker assemblies for use in vehicles are well known in the art. These assemblies generally take the form of an elongated support member which extends across the ceiling of a vehicle and is secured at opposing lintel positions. That is, the speaker assembly extends over the heads of passengers and is attached to the vehicle near the apex of the sidewalls. The elongated support member often includes speaker cabinets and speakers mounted therein. Examples of such assemblies can be found in U.S. Pat. No. 4,673,056 issued to Koppelomaki on June 16, 1987; U.S. Pat. No. 4,099,026 issued to Persson on July 4, 1978; and U.S. Pat. No. 1,732,451 issued to Walters on Oct. 22, 1929.

The recent popularity of off-road vehicles such as the Jeep Wrangler, Suzuki Samurai, and Geo Tracker has prompted the application of overhead speaker assemblies to many off-road vehicles. Unfortunately, this application has been unsuccessfully due to the additional support demands of off-road vehicles. Due to their stiffer suspensions and frequent off-road use, off-road vehicles encounter a great deal more jarring. Consequently, overhead speaker assemblies installed in such vehicles are exposed to much greater flexural forces. These forces are particularly apparent in the mid portions of the elongated support member, furthest away from the lintel attachment positions.

Additionally contributing to the problem is the fact that many off-road vehicles are not equipped with a solid ceiling member, that is, they have "soft" or "rag" tops. Unlike their road vehicle counterparts which have rigid ceilings, the off-road vehicle's soft top does not dampen flexural deformation of the speaker assembly nor offer it much support.

The exposure to higher flexural forces, accompanying off-road vehicle use, weakens the elongated support considerably, leading to a potentially dangerous condition in which the elongated support breaks or substantially deforms thereby endangering passengers.

The present invention overcomes these deficiencies in the prior by providing an overhead speaker system which is effectively supported against excessive flexural force commonly encountered when used with off-road vehicles.

SUMMARY OF THE INVENTION AND ADVANTAGES

The present invention is directed toward an overhead speaker system adapted to be mounted to opposing lintels of a vehicle. The speaker system includes an elongated support member having a longitudinal axis extending between first and second ends. The system further includes at least one speaker cabinet and at least one speaker therein. The speaker system is characterized by including at least one fastening element mounted to the elongated support member and extending transversly from the longitudinal axis for securing the elongated support member to the vehicle.

An advantage of utilizing a fastening element which is mounted to the elongated support member and extends transversely from the longitudinal axis is the support the element provides the speaker system in light of the high degree of flexural force exerted thereon.

FIGURES IN THE DRAWINGS

Other advantages of the present invention will be readily appreciated as the same becomes better understood by reference to the following detailed description when considered in connection with the accompanying drawings wherein:

FIG. 2 is a partially cut away top view of the subject overhead speaker system installed on the sports bars of a vehicle;

FIG. 3 is a side view of the subject overhead speaker system taken along line 3—3 of FIG. 2; and FIG. 4 is a perspective view of the subject overhead speaker system shown installed on the sports bars of a vehicle.

DESCRIPTION OF THE PREFERRED EMBODIMENT

Figure 1:
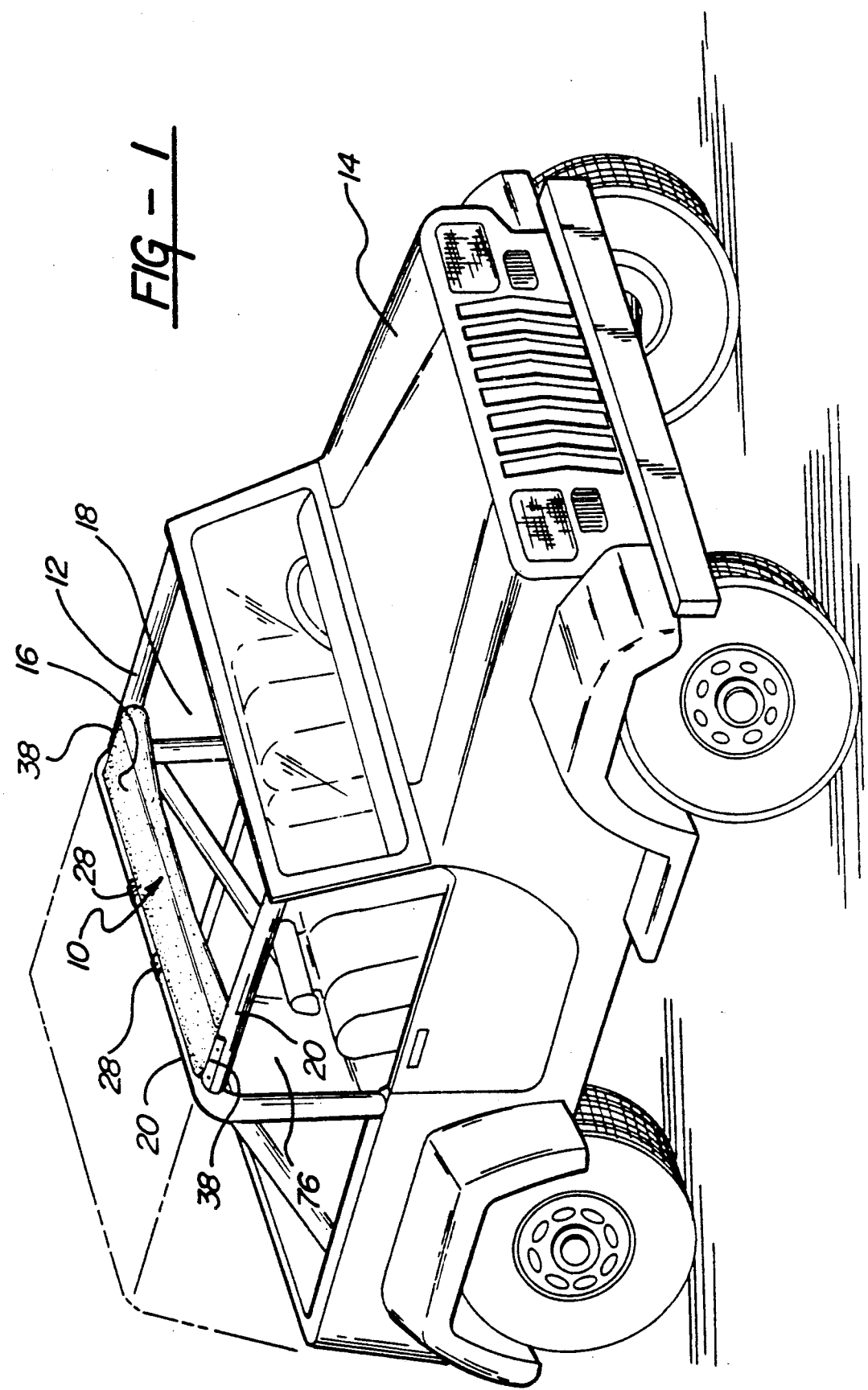
FIG. 1 is a perspective view of an off-road vehicle having the subject overhead speaker system installed thereon.

An overhead speaker system adapted to be mounted at opposing lintel positions 12 of a vehicle 14 is generally shown at 10 in FIG. 1. The speaker system 10 takes the form of an elongated support member 16 which extends across the ceiling 18 of the vehicle 14. As shown in FIG. 1, the vehicle 14 may have sport bars 20 designed to protect the occupants of the vehicle 14 or equivalent supports.

Turning to FIGS. 1 and 2, the overhead speaker system 10 is shown including an elongated support member 16 having a generally rectangular shape, and which includes first 22 and second 24 ends. The elongated support member 16 is preferably provided with a slight curvature to approximate the curve of the ceiling 18 of the vehicle 14. A longitudinal axis 26 extends between the first 22 and second ends 24 of the elongated support member, ideally transverse to the direction of travel of the vehicle 14.

The elongated support member 16 includes at least one and preferably two speaker cabinets 46 disposed adjacent of the first 22 and second ends 24. The speaker cabinets 46 generally have a rectangular cross-section and preferably have a slight curvature approximating the shape of the ceiling 18 of the vehicle 14. The speaker cabinets 46 are constructed from sheet metal but other suitable materials such as other metals, woods or organic polymeric materials may be substituted. The speaker cabinets 46 include apertures 48 therein for the mounting of speakers 50. The speaker cabinets 46 protect the speakers 50 and provide them with an echo chamber 52 to enhance sound quality.

As shown in FIGS. 1 and 2, the speaker system 10 includes at least one, and generally many fastening elements 28 mounted to the elongated support member 16, extending transversely from the longitudinal axis 26, for securing the elongated support member 16 to the vehicle 14. The fastening elements 28 include both first 30 and second 32 ends and are provided with a plurality of apertures 34 disposed therein for receiving fastening means 36, such as a nut/bolt assembly, rivet or other suitable means. The first end 30 of the fastening element 28 is secured to the elongated support member 16, more specifically the speaker cabinet 46, by disposing the fastening means 36 through the apertures 34 in the fastening element 28. Alternatively, the first end 30 may be welded or adhesively bonded to the speaker cabinet 46. Likewise, the second end 32 of the fastening element 28 is secured to the vehicle 14 by disposing the fastening means 36 through the apertures 34 disposed therein or by welding, bonding, etc. For additional stability, several fastening elements 28 may be spaced along the longitudinal axis 26 for securing the elongated support member 16 to the vehicle 14. The second end 32 of the fastening element 28 is preferably curved, or otherwise adapted for engaging a sports bar 20 of a vehicle 14 to aid in the mounting thereof.

The elongated support member is also secured to the vehicle by use of longitudinal attachments 38 mounted to the ends 22,24 of the elongated support member 16 and extend out along the longitudinal axis 26. Like the fastening elements 28, the longitudinal attachments 38 have both first 40 and second 42 ends and are provided with a plurality of apertures 44 disposed therein for receiving fastening means 36. The first ends 40 of the longitudinal attachments 38 are secured to the elongated support member 16, more specifically the speaker cabinet 46, by disposing fastening means 36 through the apertures 44 disposed therein. Alternatively, the first ends 40 may be welded or adhesively bonded to the speaker cabinet 46. The second ends 42 of the longitudinal attachments 38 are secured to the vehicle 14 by fastening means 36 previously described. The second ends 42 of the longitudinal attachments 38 are preferably curved or otherwise adapted for mounting about a sports bar 20 of the vehicle 14.

The speaker system 10 is provided with an adjustable length means 54 for adjusting the length of the elongated support member 16 along the longitudinal axis 26 to better accommodate the dimensions of different vehicles. The adjustable length means 54 is generally shown in FIGS. 1 and 2 and includes at least one and preferably two connecting rods 56 having two ends 57 and substantially parallel to the longitudinal axis 26. The connecting rods 56 are adjustably connected to the ends 22,24 of the elongated support member 16. Preferably, the connecting rods 56 adjustably connect two speaker cabinets 46 located at the ends 22,24 of the elongated support member 16. The connecting rods 56 are adjustably secured to the speaker cabinets 46 by an adjustable lock means 58. The lock means 58 is preferably secured to the speaker cabinets 46 and provides an entrance 60 for the connecting rod 56 to be inserted. The locking means 58 includes a clamp portion 59 which encloses about a portion of the connecting rods 56 and is adjustably tightened about the connecting rods 56 by tightening a screw member 61. The locking means 58 thereby secures the connecting rods 56 to the speaker cabinets 46. The amount of connecting rod 56 inserted within entrance 60 will correspond to the overall length of the elongated support member 16. Once the overall length of the elongated support member 16 has been established, the locking means 58 may be clamped about the connecting rod 56 such that the connecting rod 56 is locked in position. In the locked condition, the length of the elongated support member 16 is rigidly fixed. To adjust the length of the elongated support member 16, the locking means 58 is unclamped to allow the connecting rods 56 to be moved relative to the locking means 58 thereby affecting the overall length of the elongated support member 16. The locking means 58 preferably includes a clamp member 59 with a screw adjust head 61. The screw adjust head 61 allows for easy locking adjustment. Alternatively, the lock means 58 may include a nut and bolt assembly whereby loosening of a nut allows for the connecting rod 56 to move relative thereto. Tightening of the nut secures the clamp 59 about the connecting rod 56 thereby locking the overall length of the elongated support member 16.

The ends of the connecting rod 56 are received within tunnel portions 62. These tunnel portions 62 may be actually inside the speaker cabinet 46 itself, or alternatively may be a receiving portion attached to the outside of the speaker cabinet 46. An enclosing foam member 64 is disposed about a portion of the connecting rods 56. The foam enclosure 64 occupies a portion of space between the ends of the elongated support member 16 and provides the elongated support member 16 with a relatively uniform rectangular shape. That is, the foam enclosure 64 occupies the space between the speaker cabinets 46 thereby giving the elongated support member 16 a relatively uniform outer surface.

A cover means 66 covers at least a portion and preferably all of the elongated support member 16. The cover 66 not only performs a decorative function, it also protects the system 10 from external interferences such as the weather, small children, etc. The cover means 66 is removeably secured about the elongated support member 16 by use of securing means 68 such as velcro, rivets, buttons, or the like. The cover 66 may be made out of such materials as leather, suede, vinyl and other upholstery materials commonly used in interiors of vehicles. Preferably, the cover means 66 compliments the interior upholstery of the vehicle 14. The cover means 66 ideally includes speaker cut out portions 70 therein that coincide with the apertures 48 within the speaker cabinets 46 for the mounting of speakers 50.

At least one, and possibly several speakers 50 are mounted within each speaker cabinet 46. The speakers 50 of the present embodiment include a magnet 72 and diaphragm portion 74, however other speaker designs may be suitable. The diaphragm portion 74 is placed such that it faces the interior space 76 of the vehicle 14. The speaker 50 may be mounted to the speaker cabinet 46 by a protective grill 78. The grill 78 can be placed outside the cover means 66. The grill 78 is secured to the speaker 50 and speaker cabinet 46 by the use of plurality of fastening means 36 such as a bolt and nut assembly, rivet, or other suitable means. A wire harness 80 is included which connects the speakers to an audio source. The wire harness 80 includes first 82 and second ends 84, the first end 82 connected to the speaker 50, the second end 84 connected to a plug 86 adapted for connection to an audio source.

As shown in FIG. 4, the speaker system 10 may include an accessory support means 88 mounted to the elongated support member 16 for supporting accessories. The accessory support means 88 is preferably mounted at a center point between the ends 22,24 of the elongated support member 16, but may be mounted at any point along the elongated support member 16. The accessory support means 88 can be mounted to the connecting rods 56 by any suitable fastening means 36, however attachment must be such that it does not interfere with the adjustability of the connecting rods 56.

That is, the ends of the connecting rods 56 must remain moveable with respect to the locking means 58. The accessory support means 88 may include accessories such as illuminating means 90 for illuminating the interior 76 of the vehicle 14. The illuminating means 90 includes a plurality of lights and their corresponding control means 91. The accessory support means may also include audio means 92 for producing sound. Audio means 92 may include an am/fm receiver, compact disc player, cassette player and other known audio means. The accessory support means 88 may also include voice communication means (not shown) for verbally communicating with others at remote locations. Voice communication means may include CBs, mobile phones, or the like.

The accessory support means 88 may also include storage means 94 secured to the accessory support means 88 for storage of glasses, maps, gloves, garage door openers and similar items.

In the preferred embodiment, the overhead speaker system 10 is installed on the sports bars 20 of a vehicle 14 as shown in FIG. 1. The overall length of the system is adjusted to accommodate the vehicle 14 by loosening the locking means 58 and moving the ends 22, 24 of the elongated support member 16 in the appropriate direction, i.e., away or toward each other. Once the desired length is established, the locking means 58 is tightened about the connecting rods 56 thereby locking the length of the elongated support member 16. The second ends 42, 24 of the longitudinal attachment 38 and fastening element 28 are then fitted about the sports bars 20 and secured to them by fastening means 36 previously described. The plug attachment 86 is linked to an audio source to provide communication therebetween. Finally, any additional power attachments are linked to the system 10 providing power thereto.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An overhead speaker system (10) adapted to be mounted to opposing lintels (12) of a vehicle (14), said system comprising:
   an elongated support member (16) having a multitudinal axis extending between first (22) and second (24) ends,
   longitudinal attachments (38) extending axially from said first (22) and second (24) ends of said elongated support member (16) for securing said elongated support member (16) to the opposing lintels (12) of the vehicle (14),
   said elongated support member (16) including at least one speaker cabinet (46) having at least one speaker (50),
   said system (10) characterized by including at least one fastening element (28) mounted to said elongated support member (16) and extending transversely and laterally from said longitudinal axis (26) and spaced therealong from said ends (22,24) for securing said elongated support member to the vehicle (14).

2. A speaker system 10 as set forth in claim 1 further characterized by said fastening element (28) having first (30) and second ends (32) and a plurality of apertures (34) disposed therein for receiving fastening means (36) to secure said first end (30) of said fastening element (28) to said elongated support member (16) and to secure said second end (32) of said fastening element (28) to the vehicle (14).

3. A speaker system (10) as set forth in claim 2 further characterized by including two of said fastening elements (28) spaced from one another symmetrically along said longitudinal axis (26).

4. A speaker system (10) as set forth in claim 3 further characterized by said second end (32) of said fastening element (28) being adapted to be mounted to a sports bar (20) of a vehicle (14).

5. A speaker system (10) as set forth in claim 4 further characterized by said second end (32) of said fastening element (28) being curved for mounting about a sports bar (20) of a vehicle (14).

6. A speaker system as set forth in claim 1 further characterized by said longitudinal attachments (38) having first (40) and second (42) ends and a plurality of apertures (44) disposed therein for receiving fastening means (36) to secure said first ends (40) of said longitudinal attachments (38) to said elongated support member (16) and to secure said second ends (42) of said longitudinal attachments (38) to the vehicle (14).

7. A speaker system (10) as set forth in claim 6 further characterized by said second ends (42) of said longitudinal attachments (38) being adapted to be mounted to a sports bar (20) of a vehicle (14).

8. A speaker system as set forth in claim 7 further characterized by said second ends (42) of said longitudinal attachments (38) being curved for mounting about a sports bar (20) of a vehicle (14).

9. A speaker system as set forth in claim 1 further characterized by providing an adjustable length means (54) for adjusting the length of the elongated support member (16) along the longitudinal axis (26).

10. A speaker system (10) as set forth in claim 9 further characterized by said adjustable length means (54) including at least one connecting rod (56) adjustably connecting said ends (22,24) of said elongated support member (16).

11. A speaker system as set forth in claim 10 further characterized by said connecting rod (56) adjustably connecting two of said speaker cabinets (46) and including adjustable lock means (58) for adjustably securing said connecting rod (56) to said speaker cabinets (46).

12. A speaker system as set forth in claim 11 further characterized by said speaker cabinets (46) including tunnel portions (62), said connecting rod (56) having ends (57) both disposed in said tunnel portions (62).

13. A speaker system as set forth in claim 12 further characterized by including an enclosing member (64) disposed about said connecting rod (56), between said speaker cabinets (46).

14. A speaker system as set forth in claim 1 further characterized by including cover means (66) for covering at least a portion of said elongated support member (16).

15. A speaker system as set forth in claim 14 further characterized by providing securing means (68) for securing said cover means (66) about said elongated support member (16).

16. A speaker system as set forth in claim 15 further characterized by said cover means (66) including speaker cut-out portions (70).

17. A speaker system as set forth in claim 1 wherein said speaker cabinet (46) includes an aperture (48) disposed therethrough for receiving said speaker (50), further characterized by a plug (86) for connection to an audio source, and a wire harness (80) having first (82) and second (84) ends with said first end (82) connected to said speaker (50) and said second end (84) connected to said plug (86).

18. A speaker system as set forth in claim 17 further characterized by said speaker (50) including a protective grill (78).

19. A speaker system as set forth in claim 17 further characterized by providing an accessory support means (88) adapted to be mounted to said elongated support member (16) for supporting accessories.

20. A speaker system as set forth in claim 19 further characterized by providing accessories including illuminating means (90) for providing illumination.

21. A speaker system as set forth in claim 19 further characterized by providing accessories including audio means (92) for producing sound.

22. A speaker system as set forth in claim 19 further characterized by providing accessories including voice communication means for verbally communicating with remote locations.

23. A speaker system as set forth in claim 19 further characterized by providing storage means (94) secured to said accessory support means (88) for storage.

* * * * *